United States Patent [19]
Nakamura et al.

[11] 3,811,739
[45] May 21, 1974

[54] BRAKE SYSTEM WITH SKID CONTROL

[75] Inventors: Akira Nakamura; Hiroshi Arai; Jun Ohta, all of Toyota, Japan

[73] Assignee: Toyota Jidosha Kogyo Kabushiki Kaisha, Toyota-shi, Japan

[22] Filed: Aug. 5, 1971

[21] Appl. No.: 169,401

[30] Foreign Application Priority Data
Aug. 8, 1970  Japan.............................. 45-69024

[52] U.S. Cl............. 303/21 BE, 188/181 C, 303/20
[51] Int. Cl................................................... B60t 8/10
[58] Field of Search............ 188/181 C; 303/20, 21; 317/5; 324/160–161; 340/263

[56] References Cited
UNITED STATES PATENTS

| | | | |
|---|---|---|---|
| 3,650,575 | 3/1972 | Okamoto | 188/181 C X |
| 3,663,070 | 5/1972 | Scharlack | 303/20 X |
| 3,606,490 | 9/1971 | Ando | 303/21 BE |
| 3,652,133 | 3/1972 | Yamazaki et al. | 303/21 CG |
| 3,604,761 | 9/1971 | Okamoto et al. | 303/21 CG |

*Primary Examiner*—George E. A. Halvosa
*Assistant Examiner*—Stephen G. Kunin
*Attorney, Agent, or Firm*—David Toren

[57] ABSTRACT

In the apparatus disclosed a wheel velocity detector detects the velocity of a wheel on a vehicle that is being slowed down by a brake. A control circuit constrains a pressure regulator to decrease the pressure in the brake fluid that applies the braking force when the control circuit determines that skidding becomes likely. In the control circuit the velocity detector charges a capacitor to a reference velocity level just below the wheel velocity level. A first adjusting circuit allows the capacitor to discharge at a maximum first rate. Thus if the wheel velocity decreases beyond that maximum deceleration rate the wheel velocity may become less than the reference level. A comparator responsive to the wheel velocity detector and the capacitor level responds to the reference level exceeding the wheel velocity level by issuing a pressure reducing pulse to the pressure regulator. The pulse actuates a second adjusting circuit that increases the discharge rate of the capacitor for a given period of time. Thereafter the second adjusting circuit is inactivated and the first rate is reestablished. When, as a result of reduced pressure and braking force, the wheel velocity increases beyond the decreasing reference velocity the pressure reducing pulse ends. A third adjusting circuit measures a period of time from the onset of the pulse longer than the beforementioned time period to reestablish the second rate of discharge after the reestablishment of the first rate, in the event that the wheel velocity level does not exceed the reference level by that time. A setting circuit responds to the cessation of the pressure reducing pulse by momentarily discharging the capacitor to reestablish the differences between the wheel velocity level and the reference level.

36 Claims, 7 Drawing Figures

BRAKE SYSTEM WITH SKID CONTROL

REFERENCES TO COPENDING APPLICATIONS

This application is related to the following copending applications. The disclosures in all of these applications are hereby made a part of this application as if fully recited herein:

Application of Takeshi Ochiai, Ser. No. 109,461, filed Jan. 25, 1971, entitled SKID CONTROL SYSTEM FOR VEHICLES, and assigned to the same assignee as this application; now abandoned in favor of continuation-in-part application Ser. No. 270,584 filed Aug. 11, 1972, for SKID CONTROL SYSTEM FOR VEHICLES;

Application of Takeshi Ochiai, Ser. No. 109,465 filed Jan. 25, 1971, entitled SKID CONTROL SYSTEM, and assigned to the same assignee as this application; now abandoned in favor of continuation-in-part application Ser. No. 270,584 filed Aug. 11, 1972, for SKID CONTROL SYSTEM FOR vehicles;

Application of Hiroshi Arai et al. Ser, No. 137,858, filed Apr. 27, 1971, entitled VEHICLE BRAKE SYSTEMS USING SKID CONTROL DEVICES, and assigned to the same assignee as this application, now abandoned in favor of divisional application Ser. No. 303,142.

BACKGROUND OF THE INVENTION

This invention relates to skid control apparatuses for preventing the wheels of a vehicle from locking and skidding in response to excessive brake forces, and particularly to controls for relieving brake forces when wheel lock becomes likely. The invention relates more generally to vehicle brake systems, vehicles themselves, and methods for skid control in such brake systems.

Such skid control apparatuses may be used, for example, with automobiles. In such apparatuses a pressure regulator reduces or relieves the pressure applied by the vehicle's master cylinder when a controller detects the fact that the wheel velocity, as measured by a wheel sensor is decreasing faster than a reference velocity. Several embodiments of such apparatuses are disclosed in the before-mentioned copending applications.

In general such apparatuses or systems attempt to bring a vehicle to a halt within a minimum braking distance without causing loss of control or spinning of the vehicle body due to wheel lock. The attempt is to regulate the force of the brake on the wheel to produce the above effect regardless of the physical effort applied by the brake pedal when an operator attempts to stop the vehicle, such as in an emergency.

Such skid control apparatuses or systems rely upon a factor known as the wheel slip ratio, namely the fractional departure of the wheel velocity from the vehicle velocity. This ratio is expressed in the following equation wherein $S$ is the slip ratio, $V$ the vehicle body velocity, and $V_w$ the wheel velocity:

$$S = (V - V_w)/V$$

As the wheel slip ratio increases the coefficient of friction between a wheel and a road surface, or the tire torque, increases rapidly in proportion thereto, until it reaches a maximum. Thereafter the coefficient of friction or the tire torque decrecrease slowly as the wheel slip ratio increases. However, the absolute value of the coefficient of friction or the tire torque varies widely with road surfaces. For example, the coefficient of friction, or tire torque is substantially high on a dried asphalt road surface but quite small on a surface covered with ice. Moreover, it is technically quite difficult to obtain the coefficient of friction between a wheel and a road surface, or the wheel slip ratio, directly from a vehicle being braked. Consequently, various attempts have been directed to find the variables at which optimum control of braking pressure is insured without causing wheel lock on any kind of road surface, regardless of the condition and having a wide variety of coefficients of friction.

Proposals have been made for skid control apparatuses which detect the deceleration of a wheel mechanically or electrically and forcibly reduce the braking pressure being applied to the wheel, regardless of the operation of the vehicle driver, when the detected deceleration exceeds a preset value. This decreases the brake torque to prevent wheel lock. In such devices a control utilizes the wheel deceleration having no relation with factors causing wheel lock such as the coefficient of friction or wheel slip ratio. The control operation is accomplished only with an initial set value. Therefore, if the coefficient of friction varies widely with a road surface condition, optimum control cannot be ensured. For example, the braking pressure may be unnecessarily decreased. The braking distance may thereby be markedly increased. Moreover, wheel lock may be caused while a vehicle is still moving.

An object of this invention is to improve skid control apparatuses and systems.

Another object of this invention is to obviate the above mentioned difficulties.

Still another object of this invention is to control the braking force by seeking the maximum value of the coefficient of friction between a wheel and a road surface and obtaining the maximum tire torque corresponding to the maximum coefficient of friction so that a vehicle can be halted at the minimum braking distance without causing wheel lock.

SUMMARY OF THE INVENTION

According to a feature of the invention these objects are attained in a brake force modulating apparatus that varies the braking force applied by a brake to a wheel in response to the wheel velocity, by comparing the velocity of the wheel to a reference level representing a reference velocity and issuing a first brake varying signal during a first relationship between the reference velocity and the wheel velocity and a second brake varying signal during a second relationship, and establishing the reference level so that it varies with the wheel velocity but at a maximum first rate in one direction during the first relationship and at a second rate during a given period of time after the start of the second relationship and a third rate thereafter.

According to another feature of the invention a fourth rate is established after a second given time period has elapsed since the onset of the second relationship.

According to still another feature of the invention maintenance means maintain the reference velocity at a predetermined level relative to the wheel velocity when the wheel velocity varies less than the maximum first rate in the one direction during the first relationship.

According to a more specific aspect of the invention, a reference wheel velocity is set at a value smaller than the wheel velocity by a certain value. The reference wheel velocity is compared with the wheel velocity. When the wheel velocity becomes lower than the reference wheel velocity, the braking pressure is decreased, and the set deceleration of the reference wheel velocity is increased during a first definite period of time and is decreased after the period of time has elapsed. When the wheel velocity exceeds the reference wheel velocity due to the above-described decrease in the braking pressure, the braking pressure is increased and the reference wheel velocity is reset at a value smaller than the wheel velocity by a certain value. Thus, the initial condition is restored. The above-described operations are repeated several times to seek the maximum coefficient of friction between a wheel surface and the road. Thus the braking pressure is controlled by utilizing the maximum coefficient of friction.

Furthermore, according to this invention, when the coefficient of friction is suddenly increased and the wheel velocity being recovered is decreased due to the change in the condition of a road surface at the time of the decrease of the above-mentioned braking pressure, the set deceleration of the reference wheel velocity is increased more than the above mentioned deceleration after the time separately set has elapsed. Therefore, the wheel velocity exceeds the reference wheel velocity in a short period of time and the decrease of the braking pressure at this time is stopped. This increases the braking pressure in conformity with the condition of the road surface and eliminates unnecessary increases in the stopping distance.

These and other features of the invention are pointed out in the claims. Other objects and advantages of the invention will become obvious from the following detailed description when read in light of the accompanying drawings.

BRIEF DESCRIPTION OF PREFERRED EMBODIMENTS

Figure 1:
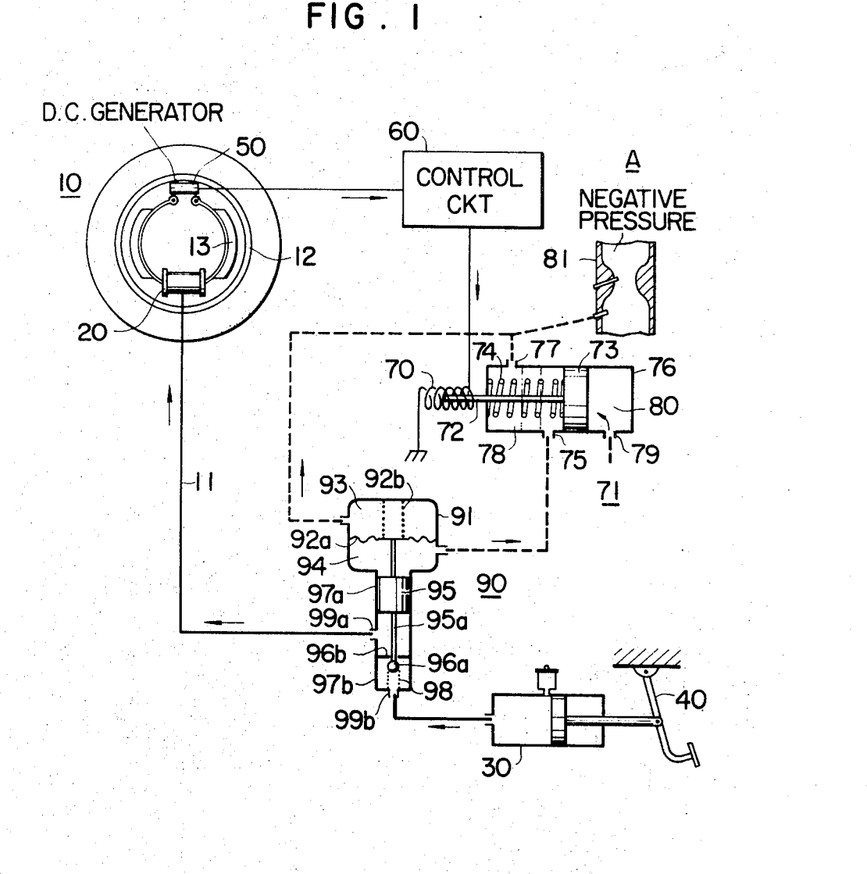
FIG. 1 is a schematic illustration of a brake system utilizing a skid control apparatus embodying features of the invention.

In FIG. 1 the brake system illustrated slows down and stops a wheel 10 of an automobile A. The brake system illustrated is shown as representing the entire automobile in FIG. 1. In the brake system a hydraulic pressure line 11 constrains a wheel cylinder 20 to engage a brake shoe 13 with a brake drum 12 in response to the force applied by a brake pedal 40 to a master cylinder 30. That is the wheel cylinder 20 is operated by the hydraulic pressure generated in the master cylinder 30, and hence the line 11, in conformity with the effort applied to the brake pedal 40. The wheel cylinder 20 then responds to the pressure in the line 11 by pressing the brake shoe 13 against the brake drum 12 to slow and stop the rotating wheel 10.

In the brake system a wheel velocity voltage generator 50 is composed of a DC generator installed on the wheel 10. The generator 50 generates a DC wheel velocity voltage corresponding to the velocity of the wheel 10. A control circuit 60, connected by an electric line to the wheel velocity voltage generator 50, detects the possibility of wheel lock during application of the brake in response to receipt of the wheel velocity voltage. The control circuit 60 and the generator 50 form a wheel lock detector. The control circuit then issues an electrical signal to a pressure modulator generally designated PM interposed in the line 11 to relieve the brake pressure applied to the wheel cylinder 20 when the wheel 10 is likely to lock. When the control circuit 60 issues its electrical pressure relieving signal an electromagnetic coil 70 of an electromagnetic three-way change-over valve 71 draws an operating rod 72 and a piston 73 to the left. Without the pressure reducing signal a spring 74 forces the piston 73 to a position to the right of a port 75 in the cylinder 76. This permits communication between the port 75 and a port 77 in the left hand chamber 78 of the cylinder 76. It cuts off a port 79 that is open to the atmosphere in a chamber 80 of the cylinder 76. A pressure reducing signal from the control circuit 60 in the coil 70 moves the piston 73 to the left of the port 75 to the position shown in phantom lines and causes the port 75 to communicate with the port 79. At the same time the ports 77 and 75 are cut off.

The connecting port 77 is connected to an intake pipe 81 of a source of negative pressure in the engine intake of the vehicle. The connecting port 75 connects to a brake pressure modulating valve 90. Thus when the control circuit 60 does not issue a pressure reducing signal, the electromagnetic coil 70 remains deenergized and the piston 73 is moved by the spring 74 to bring the port 75 into communication with the port 77, thus admitting negative pressure from the intake pipe 81 into the operating pressure modulating valve 90. When the control circuit issues its reducing signal the electromagnetic coil 70 is excited. Therefore the piston 73 is moved by the electromagnetic pulling force of the electromagnetic coil 70 to interrupt communication between the ports 75 and 77. This causes ambient pressure to be applied to the modulating valve 90 through the communicating ports 75 and 79.

The pressure modulating valve 90 includes a body 91 which interrupts the brake line 11. A diaphragm 92a, forced downwardly by a spring 92b, divides the body 91 into two chambers 93 and 94. The chamber 93 is connected to the intake pipe 81. The lower chamber 94 is connected to the port 75. A piston 95, which the diaphragm 92a slides longitudinally in the body 91 actuates a rod 95a. When the pressures in the chambers 93 and 94 are equal the rod 95a holds a valve 96a away from a valve seat 96b. The valve seat 96b divides the lower elongated portion of the chamber 94 into two chambers 97a and 97b. A spring 98 biases the valve 96a toward the valve seat 96b.

The equal pressures in the chamber 93 and 94 that remove the valve 96a from the seat 96b allow pressure from the master cylinder 30 to be transmitted unhindered through the line 11 by means of an outlet port 99a and an inlet port 99b which are brought into communication by the open valve 96a. As will be described equal pressures in the chambers 93 and 94 are the result of no pressure reducing signal.

Thus when no pressure reducing signal reaches the coil 70 the pipe 81 produces negative pressure in the chamber 93 through the line directly connecting the chamber with the pipe, and produces negative pressure in the chamber 94 through the communication ports 75 and 77. The pressures in chambers 93 and 94 are therefore equal. During this time the resilient force of the spring 92b presses the diaphragm 92a to move the piston downwardly against the biasing force of the spring 98. The rod 95a keeps the valve 96a unseated from the seat 96b. This establishes connumication between chambers 97a and 97b. Consequently the hydraulic pressure generated in the master cylinder 30 is passed to the wheel cylinder 20 as is. As a result the normal braking operation is performed in accordance with the physical effort applied to the brake pedal 40.

A pressure reducing signal from the control circuit 30 causes the coil 70 to draw the piston 73 to the left between the ports 75 and 77. This causes the chamber 94 to communicate with the atmospheric air through the ports 75 and 79. The pressure in chamber 94 then exceeds the pressure in chamber 93, thereby displacing the diaphragm 92s upwardly against the force of the spring 92b. This moves the piston 95 upwardly and draws the rod 95a as well as the valve 96a upwardly. It presses the valve 96a against the valve seat 96b to close the valve 96a. Consequently communication between the master cylinder 30 and the wheel cylinder 20 is interrupted. Furthermore, movement of the piston 95 increases the volume of the chamber 97a and decreases the hydraulic pressure in the wheel cylinder 20. This forcibly reduces the braking force of the brake drum and brake show 12 and 13 upon the wheel 10.

Figure 2:
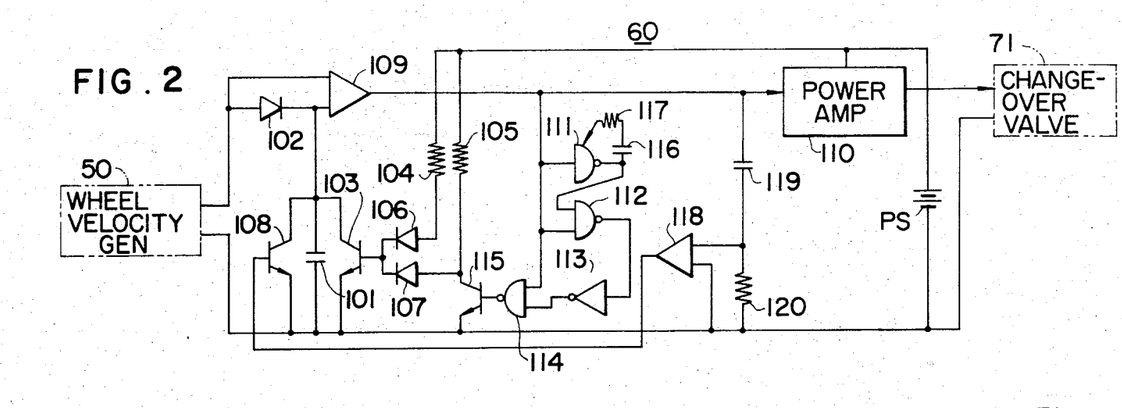
FIG. 2 is a schematic diagram of a control circuit in FIG. 1 and embodying features of the invention.

FIG. 2 illustrates an embodiment of the control circuit 60. Here the wheel velocity generator 50 charges a capacitor 101 through a diode 102. The diode 102 prevent reverse current and produces a forward voltage drop. Thus the generator 50 provides the current to charge the capacitor 101 to a voltage corresponding to, but slightly less than, the wheel velocity voltage generated in the wheel velocity voltage generator 50. A transistor 103 having a path of major current flow connected in parallel with the capacitor 101 discharges the electric charge stored across the capacitor 101 at a time rate corresponding to a predetermined set deceleration. Thus, a reference wheel velocity voltage corresponding to, but slightly less than, the reference wheel velocity, and capable of decreasing in conformity with the set deceleration, is generated across the plates of the capacitor 101.

A pair of resistors 104 and 105 connect the base of transistor 103 to the positive terminal of a power source PS through a pair of diodes 106 and 107. The latter prevent mutual interference of current. The resistors 104 and 105 establish discharge rates of the capacitor 101. That is to say the resistors 104 and 105 establish biasing voltages and currents which, without interfering with each other, establish the set decelerations.

The path of major current flow of a transistor 108 is also connected across the capacitor 101. This path discharges the electric charge stored across the capacitor 101 at a time constant greater than that of the discharge due to the transistor 103. A differential amplifier 109 receives inputs from the wheel velocity voltage generator 50 and also the capacitor 101. The voltage established across the capacitor 101 constitutes the reference wheel velocity voltage. Thus the amplifier 109 compares the wheel velocity voltage of the wheel velocity voltage generator 50 with the reference wheel velocity voltage across the capacitor 101. It issues a pressure reducing logic signal "1" when the wheel velocity voltage from the wheel velocity voltage generator 50 becomes lower than the reference wheel velocity voltage across the capacitor 101. The differential amplifier 109 issues a logic "0" for absence of the reducing signal when the wheel velocity voltage from the generator 50 exceeds the reference voltage across the capacitor 101.

A power amplifier 110 connects the differential amplifier 109 to the electro magnetic coil 70 of the electromagnetic three-way change-over valve 71. It amplifies the reducing signal "1" to a magnitude large enough to operate the valve 71.

NAND gates 111, 112 and 114 cooperate with each other and a NOT gate 113 to establish a current in the resistor 105 that will increase the set deceleration of the reference wheel velocity over a predetermined period of time. In effect the NAND gates 111, 112 and 114 and the NOT gate 113 are adapted to determine the time for increasing the set deceleration of the reference wheel velocity.

During the absence of an output from the differential amplifier 109, that is during a "0" signal, a "0" signal appears at one input of the NAND gate 114. Thus the output of the NAND gate 114 is high or exhibits a "1" signal to cause the transistor 115 to conduct. This lowers the voltage applied by the resistor 105 and the diode 107 to the base of transistor 103. Thus, while the differential amplifier 109 produces no pressure reducing signal the discharge rate of the capacitor 101 is established by the tansistor 103 mainly on the basis of the resistor 104 rather than the combination of the resistor 104 and 105. In effect this produces a slower discharge.

During a "0" output of the differential amplifier 109 the "0" signal also appears at one input of the NAND gate 112. Thus the output of the NAND gate 112 is "1." The NOT gate 113 reverses this signal and applies a "0" signal to the other terminal at the input of the NAND gate 114. The same "0" input from the differential amplifier 109 also produces a quiescent "1" output at the output of NAND gate 111 and a "1" signal at the other input of the NAND gate 112.

When the output of the differential amplifier 109 changes to "1" as a result of the wheel velocity voltage from the wheel velocity generator 50 becoming lower than the reference wheel velocity voltage across the capacitor 101, then this "1" signal is applied to the upper input of the NAND gate 114. At the same time this "1" signal appears at the lower input of the NAND gate 112 and at the input of the NAND gate 111. However, the signal at the upper input of NAND gate 112 does not change immediately to "0" because the capacitor 116 and the resistor 117, which connect the output of the NAND gate 111 to an expander input terminal of the NAND gate 111, prevent the output from changing immediately. Thus two "1" signals appear at the inputs of the NAND gate 112. A "0" signal appears at the output of the NAND gate 112, which "0" signal is converted to a "1" signal by the NOT gate 113. Thus, at the moment of a "1" signal at the output of differential amplifier 109 two "1" signals appear at the input of the NAND gate 114. The resulting "0" output signal of the NAND gate 114 causes the transistor 115 to stop conducting.

The lack of conduction of the transistor 115 causes the resistor 105 to apply a higher biasing voltage to the base of transistor 103 and increase the rate of discharge of capacitor 101. After a time determined by the time constant of resistor 117 and capacitor 116 the upper input to the NAND gate 112 changes to "0". The output of NAND gate 112 changes to "1" and the output of NOT gate 113 changes to "0." This produces a "1" signal at the output of NAND gate 114 and the base of transistor 115. The resulting conduction of transistor 115 reduces the voltage at the base of transistor 103 so as to reduce the rate of discharge of the capacitor 101. Thus the rate of discharge returns to the rate that occurred originally before the appearance of a "1" signal at the output of differential amplifier 109.

In summary, the absence of a "1" signal at the output of differential amplifier 109 causes the transistor 103 to discharge the capacitor 101 at a rate determined substantially only by the resistor 104 while conduction of transistor 115 prevented the resistor 105 from contributing substantially to the rate of discharge. The appearance of a "1" signal at the output of differential amplifier 109 increases the rate of discharge of capacitor 101 through the transistor 103 by producing a higher voltage created by lack of conduction in the transistor 115. This lack of conduction in the transistor 115 continues during a period of time determined by the time constant of capacitor 116 and resistor 117. At the end of this time period the conduction of transistor 115 resumes thereby again decreasing the rate of discharge of capacitor 101 even during the maintenance of the "1" signal at the output of differential amplifier 109.

A capacitor 119 connected in series with a resistor 120 at the output of the differential amplifier 109 forms a differentiating circuit to differentiate the output signal of the differential applifier 109. Thus it produces a positive pulse at the start of the "1" signal at the output of differential amplifier 109, that is at the start of the pressure reducing signal, and produces a negative pulse at the start of a "0" signal, namely at the end of the pressure reducing signal. An amplifier 118 connected to the differential circuit inverts the negative pulse and applies it to the base of a transistor 108 to cause the latter to discharge the capacitor 101 rapidly for a moment. The transistor 108 which is normally effectively cut off responds to the positive pulses appearing at the start of a pressure reducing signal simply by remaining cut off.

Figure 3:
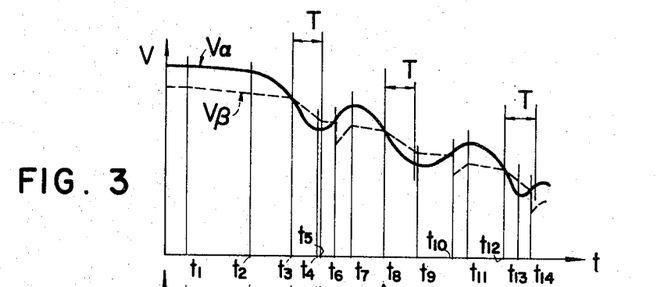
FIG. 3 is a graph illustrating the changes in wheel velocity and reference wheel velocity, or voltage equivalents thereof, in the embodiment of the invention illustrated in FIGS. 1 and 2.
Figure 4:
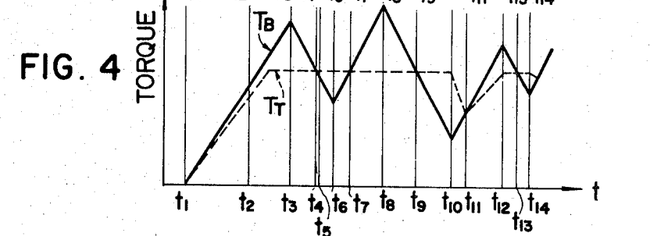
FIG. 4 is a graph illustrating changes of the brake torque and tire torque over periods of time in the embodiments of the invention disclosed in FIGS. 1 and 2.

The operation of the control circuit in FIG. 2 can best be appreciated by referring to the curves of FIGS. 3 and 4. In FIGS. 3 and 4 the abscissas represent the time t along the same scale. The ordinate in FIG. 3 represents the wheel velocity $V_\alpha$ and the reference wheel velocity $V_\beta$. The ordinate in FIG. 4 represents the brake torque $T_B$ and the tire torque $T_T$. Now, if the vehicle is traveling under steady state conditions, no brake pressure is applied and the brake torque $T_B$ is zero. In this case the capacitor 101 of the control circuit 60 is charged by the wheel velocity voltage of the wheel velocity voltage generator 50 through the diode 102. The reference wheel velocity voltage across the capacitor 101 is thus lower than the wheel velocity voltage by a value corresponding to the forward voltage drop across the diode 102. Thus the reference wheel velocity $V_\beta$ is set at a value lower than the wheel velocity $V_\alpha$ by a given velocity or set velocity $v$. Consequently, the differential amplifier 109 does not issue a pressure reducing signal and its output is a signal "0." This is so because the voltage $V_\alpha$ exceeds the voltage $V_\beta$.

At this time the "0" output signal from the differential amplifier 109 is applied to one communicating the input terminals of the NAND gate 114. The gate 114 produces an output signal "1" regardless of the input signal at the other terminal thereof. An output signal "1" regardless of the input signal at the other terminal thereof. Consequently the transistor 115 conducts. Thus, the base current to be supplied to the transistor 103 through communication resistor 105 is bypassed by the transistor 115. As a result the base current in the transistor 103 constitutes the current supplied through the resistor 104. The time discharge rate, or what may be called the time constant, for discharging the charge stored across the capacitor 101 by means of the transistor 103 is thus small. The resistor 104 thus determines the first set deceleration $G_1$ and establishes it at a small value.

During this time the reference voltage across the capacitor substantially follows the voltage of generator 50 as long as the latter voltage does not decrease at a rate faster than the discharge rate established in the resistor 103 by the resistor 104. The logic signal at the lower input terminal of the NAND gate 114 is also zero due to the existence of a zero at the lower input terminal of the NAND gate 112 and the consequent "1" signal at the output of NAND gate 112.

When the brake pedal 40 is depressed at the time $t_1$ the brake pressure corresponding to the effort that the brake pedal 40 is applied to the wheel 10 by means of the braking pressure modulating valve 90. The braking effect on the wheel 10 does not take place fully during the initial period. As a result the reference wheel velocity $V_\beta$ stays at a lower value than the wheel velocity $V_\alpha$ by an amount equal to the set velocity $v$ in the same manner as during steady state travel.

When the deceleration of the wheel velocity $V_\alpha$ exceeds the first deceleration $G_1$ of the reference wheel velocity $V_\beta$ at the time $t_2$, the decrease of the wheel velocity $V_\alpha$ suddenly becomes large. The capacitor 101 starts to discharge at the rate established in the transistor 103 by the resistor 104, that is at the first set deceleration. The voltage generated across the capacitor at the start of the discharge is considered as the initial velocity voltage. Consequently the reference wheel velocity $V_\beta$ decreases at the rate of the set deceleration $G_1$. The latter has a small value.

When the wheel velocity $V_\alpha$ decreases below the reference wheel velocity $V_\beta$ at the time $t_3$ the differential amplifier 109 in the control circuit 60 issues a pressure reducing signal "1" by comparing the voltages corresponding to both velocities $V_\alpha$ $V_\beta$. After the reducing signal is amplified by the power amplifier 110 the electromagnetic coil 70 of the electromagnetic change-over valve 71 is excited. Thus the electromagnetic change-over valve 71 and the brake pressure modulating valve 90 are actuated as described above. The pressure being applied to the wheel 10 is thus forcibly reduced to decrease the brake torque $T_B$. Consequently, the wheel velocity $V_\alpha$ increases again after decreasing to a minimum at the time $t_4$ with a particular finite decreasing gradient of hydraulic pressure due to the time lag of the action of the electromagnetic three-way change-over valve 71 and the braking pressure modulating valve 90.

At the time $t_3$ the differential amplifier 109 in the control circuit 60 produces the signal "1." The signal at the input to the NAND gate 111 then changes from "0" to "1." The signal at the output of NAND gate 111 attempts to change "1" to "0". However, the "1" state is maintained as long as the capacitor 116 is being discharged at the time constant determined by the capacitor 116 and the resistor 117. The "1" signal continues to be applied to the upper input of the NAND gate 112. At the same time the "1" signal from the amplifier 109 is applied to the lower input of the NAND gate 112. This produces a "0" output from the gate 112. The gate 113 changes this "0" output to a "1" input at the gate 114. This "1" input combines with the "1" input from the amplifier 109 to produce a "0" output at the NAND gate 114 and a "0" input at the base of transistor 115.

The previously conducting transistor 115 is thus turned off and current passing through the resistor 105 to bias the base of transistor 103 more positively. This increases the discharge rate or time constant for discharging the capacitor 101. The discharge rate proceeds at a second rate larger than the first rate. Consequently the reference wheel velocity $V_\beta$ is set at a second set deceleration $G_2$ having a large value during a definite time period T between $t_3$ and $t_5$.

The second set deceleration $G_2$ continues only while the capacitor 116 is being discharged at the time constant determined by the capacitor 116 and the resistor 117. When a certain state of discharge of capacitor 116 is reached, namely at the end of the time T or at the time $t_5$, the "1" signal at the input of NAND gate 111 succeeds in turning the "1" signal at the output of NAND gate 111 to "0". This turns the output of NAND gate 112 to "1" and the lower input of NAND gate 114 to "0", thereby applying a "1" signal to the base of transistor 115. The subsequent conduction of the transistor 115 reduces and substantially eliminates the effect of resistor 105 upon the base of transistor 103. The time constant for discharging the capacitor 101 through the transistor 103 decreases. Thus the reference wheel velocity $V_\beta$ is changed back to the first set deceleration $G_1$ having a comparatively small value.

During this time the wheel velocity $V_\alpha$ increases as a result of the decrease in braking pressure. At the time $t_6$ the wheel velocity $V_\alpha$ exceeds the reference wheel velocity, which between the times $t_5$ and $t_6$ decreases at the first set deceleration $G_1$ having the small value. At the time $t_6$ the differential amplifier 109 of the control circuit 60 releases the pressure reducing signal by comparing the voltages corresponding to both velocities $V_\alpha$ 4 and $V_\beta$. Therefore, the electromagnetic coil 70 of the electromagnetic three-way change-over valve 71 is deenergized. As a result the electromagnetic three-way change-over valve 71 actuated and described hereinbefore and the braking pressure modulating valve 90 increases the braking pressure due to the change in the volume thereof. The wheel velocity $V_\alpha$ decreases again after increasing to a maximum at the time $t_7$ with a certain definite gradient of hydraulic pressure due to the time lag of the actuation of the means 71 and 90.

At the time $t_6$ the differential amplifier 109 of the control circuit 60 changes from the signal "1" to "0". This generates a negative pulse at the input to the amplifier 118. The amplifier 118 generates a positive output pulse. The transistor 108 is rendered momentarily conductive by the output pulse. The capacitor 101 is rapidly discharged by conduction of transistor 108. Consequently, the reference velocity $V_\beta$ is reset at a smaller value than the wheel velocity $V_\alpha$ by the definite set velocity $v$. The condition corresponding to that of the initial steady state is resumed.

From the time $t_6$ is on, the above-described operations are repeated several times and the tire torque $T_T$ is controlled so that the coefficient of friction is maximized. This produces an optimum skid control. In this embodiment the set deceleration of the reference wheel velocity $V_\beta$ is determined in two steps at the time when the brake torque $T_B$ decreases. The same effect may be obtained by determining the deceleration in several steps or by successively decreasing it after increasing it to a larger value.

The construction of the control circuit in FIG. 2 is based upon the assumption that the condition of the road surface is uniform while the brake is applied and that the coefficient of friction between the road surface and the wheel is nearly constant. Consequently if the coefficient of friction suddenly decreases, for example between the time $t_5$ and the time $t_6$ in the above description, the wheel velocity may not increase in accordance with the condition of a road surface but may be decreased further. If this occurs the wheel velocity will lose the change to intersect the reference wheel velocity with its low set deceleration. The lowered braking pressure then continues. Consequently the brake pressure remains in its reduced state and the braking distance is unnecessarily increased. This causes undesirably long stops.

In order to avoid this type of operation another embodiment of the control circuit 60 is used. This embodiment is described below with reference to FIG. 5.

The embodiment of the control circuit 60 shown in FIG. 5 will be described by omitting those portions that correspond with the circuit 60 illustrated in FIG. 2. At the output side of the differential amplifier 109, a NAND gate 201 is connected to the output terminal of the differential amplifier 109 in the same manner as the NAND gate 111. This constitutes a delay circuit comprising a resistor 202 and a capacitor 203. A NOT gate is connected to the output of the NAND gate 201 to reverse the signal. One of two input terminals of a NAND gate 205 is connected to the differential amplifier 109 and another input terminal is connected to the output of the NOT gate 204, thus deriving a "1" as long as either of the inputs is "0" to the gate 205. In effect this could be said to derive the "OR" of both inputs. An AND gate 206 receives the output of the gate 205 at one input terminal and the output of the gate 114 at another input terminal. The AND gate 206 applies its output to the base of the transistor 115.

The AND gate 206 is effectively interposed between the NAND gate 114 and the base of transistor 115. When the differential amplifier issues a "0" output the "0" value appears at the inputs of gates 114 and 205. The resulting "1" outputs of these two gates than appear at the inputs of AND gate 206 to produce a "1" input at the base of transistor 115. This causes transistor 115 to conduct and effectively remove the current passing through resistor 105 from the base of transistor 103. Thus the transistor 103 discharges the capacitor 101 at the slow first deceleration rate. When the output of amplifier 109 changes to "1" an input to the NAND gate 114 becomes "1". The other input also becomes "1" because, as explained with respect to FIG. 2 the resistor 117 and capacitor 116 maintain the "1" input to NAND gate 112 while the amplifier 109 places another "1" at the input of NAND gate 112. The resulting "0" at the output of NAND gate 112 then appears as a "1" at the input of the NAND gate 114. This changes the input to the AND gate 206 to "0" thereby reducing the bias upon transistor 115 and cutting it off. This allows the resistor 105 to have current affect the conduction of transistor 103 and the deceleration rate in the reference voltage across the capacitor 101 is increased to the second value. During this time the lower terminal of AND gate 206 receives a "1" input as a continuation from the former "1" input. This is so because the resistor 202 and capacitor 203 prevent the "0" appearing at the right input to NAND gate 205 from changing from "0" despite the presence of a "1" at the left input terminal of NAND gate 205.

When, as described above, the capacitor 116 allows the output of NAND gate 114 to change to "1" the output of AND gate 206 is again "1" thereby again shunting the current in resistor 105 to ground and obviating its effect upon the discharging current in transistor 103. Thereafter, when the output of amplifier 109 is still "1", and the time constant of capacitor 203 and resistor 202 finally permit the output of NAND gate 201 to change to "0" and place another "1" signal at the input of NAND gate 205 through the NOT gate 204, a "0" signal appears at the lower input of AND gate 206. This turns off transistor 115 and again causes the current through the resistor 105 to increase the conduction of transistor 103. This again increases the discharge rate of capacitor 101 to the second set deceleration.

When the pressure reducing signal from the amplifier 109 has finally caused the wheel to accelerate enough for the rotational velocity to exceed the reference velocity the amplifier 109 issues a "0" signal. This returns the input of AND gate 206 to "1" values. The differentiating circuit composed of capacitor 119 and resistor then cause the amplifier 118 to make transistor 108 to discharge capacitor 101 momentarily and establish the initial condition.

Figures 6, 7:
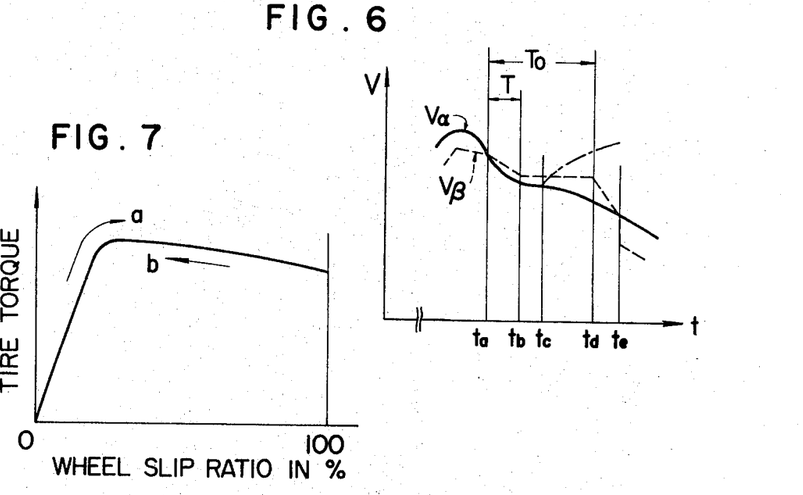
FIG. 6 is a time diagram illustrating changes in the reference wheel velocity and the actual wheel velocity, or voltage equivalents thereof, in the embodiments of the invention illustrated in FIGS. 1 and 5.
FIG. 7 is a graph of changes in tire torque for changes in the wheel slip ratio in the embodiment of the invention illustrated in FIGS. 1, 2 and 5.

The overall operation of the above-described embodiment of the control circuit can best be understood from FIG. 6. In FIG. 6 the abscissa represents the time $t$ as in FIG. 3. The ordinate represents the wheel velocity $V_\alpha$ and the reference wheel velocity $V_\beta$. Thus FIG. 6 illustrates a part of the relationship between the time, wheel velocity, and reference wheel velocity. When the wheel velocity $V_\alpha$ is higher than the reference wheel velocity $V_\beta$ during the period of time before the time $t_a$, the output of the differential amplifier 109 is the signal "0". The output of NAND gates 114 and 205 are "1". The consequent "1" at the output of AND gate 206 causes the transistor 115 to conduct. Thus the first set deceleration $G_1$ having a small value is set as described hereinbefore.

When the differential amplifier 109 issues a brake pressure reducing signal "1" at the time $t_a$ due to the decrease of the wheel velocity $V_\alpha$ below the reference wheel velocity $V_\beta$, a definite time T extending from time $t_a$ to $t_b$ is established by the time constant of resistor 117 and capacitor 116 as described hereinbefore. The output of the NAND gate 114 becomes "0" as described hereinbefore. The output of the NAND gate 114 becomes "0" during the time T. At this time the output of NAND gate 201 attempts to change from "1" to "0" in the reverse relationship with respect to the output of the differential amplifier 109. However, the "1" state is maintained as long as the charge on capacitor 203 is being discharged through the resistor 202. The NOT gate 204 thus applies a "0" to the input of NAND gate 205. The latter thus produces a "1" signal at its output. This continues for a time period $T_0$ extending from the time $t_a$ to the time $t_d$. The time $T_0$ is longer than the time T. Thus a "1" signal appears at the lower input of AND gate 206 between the time $t_a$ and $t_d$. Thus, during the time $T_0$, the output of the AND gate 206 and the input to the base of transistor 115 follows the output of the NAND gate 114. Consequently when the NAND gate 114 becomes "0" between the times $t_a$ and $t_b$ the output of AND gate 206 is also "0".

The "0" signal at the transistor 115 brings that transistor into non-conduction and sets the second set deceleration $G_2$ of a large value on the basis of current passing through resistors 104 as well as 105 as described hereinbefore. This starts at the time $t_a$ and continues to the time $t_b$. After the time T has elapsed, the output of NAND gate 114 returns to "1." As the output of NAND gate 205 remains at "1," the output of AND gate 206 becomes "1." This occurs at the time $t_b$. Thus the transistor 115 conducts to set the first decleration $G_1$ having a small value as described hereinbefore. This continues between the time $t_b$ and $t_d$.

As described above, the pressure reducing signal is issued at the time $t_a$ by detecting the possibility of wheel lock at the time of emergency braking. The wheel velocity $V_\alpha$ tends to increase after it has once decreased due to the time delay of the action of the electromagnetic 3-way change-over valve 71 and the braking pressure modulating valve 90. When the coefficient of friction increases rapidly because of non-uniform road surface conditions at the time $t_c$, the wheel velocity $V_\alpha$ which would ordinarily have increased is rapidly decreased. During this time the reference wheel velocity $V_\beta$ is decreasing at the small first set deceleration. The wheel velocity $V_\alpha$ then loses the opportunity to intersect with the reference wheel velocity $V_\beta$. This causes the pressure reducing signal to be maintained. Thus the brake force continues to be reduced without taking advantage of the increase in the coefficient of friction. However, this continues only till the time $t_d$.

At the time $t_d$ the time period $T_0$ which was set at the time $t_a$ to be longer than the time T, ends and the output of the NAND gate 201 finally becomes "0". This places a second "1" signal at the input of NAND gate 205 and produces a "0" output at the NAND gate 205. Consequently the output of the AND gate 206 becomes "0" and the transistor 115 is rendered non-conductive. Thus the reference wheel velocity $V_\beta$ is set at the large second set deceleration. The wheel velocity $V_\alpha$ 24 intersects the reference wheel velocity at $V_\beta$ at the time $t_e$. Therefore the pressure reducing signal of the differential amplifier 109 changes over to "0" and the brake pressure is increased. In this manner the control circuit 60 and the entire system effectively copes with the changes in the coefficient of friction.

Figure 5:
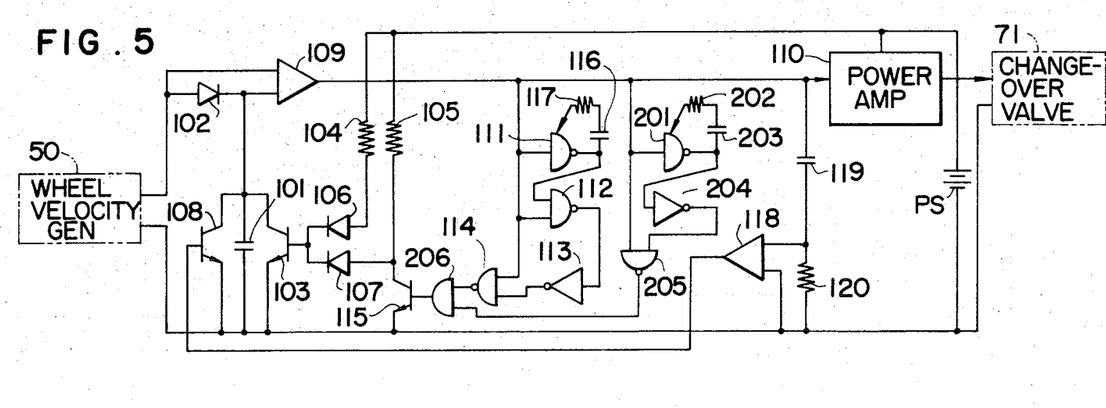
FIG. 5 is a schematic diagram illustrating another control circuit suitable for use with FIG. 1 and embodying features of the invention.

The operation of the embodiments of the invention illustrated in FIGS. 1, 2 and 5 are based upon principles which arise from the following relationship generally established between the brake torque $T_B$ established by a wheel cylinder such as 20 upon a wheel such as 10 and the tire torque $T_T$ established between the tire of a wheel such as 10 and the ground.

$$T_B = T_T + \text{torque due to wheel inertia} = T_T + I\alpha$$

Here $I$ represents the inertia of the wheel such as 10 and $\alpha$ its deceleration. It will be apparent from the above equation that the difference between the brake torque $T_B$ and the tire torque $T_T$ is proportional to the deceleration or acceleration of the wheel. Consequently, if the brake torque $T_B$ is greater than the tire torque $T_T$, a wheel is being decelerated. On the contrary if the brake torque $T_B$ is smaller than the tire torque $T_T$, the wheel is being accelerated.

The slip ratio of a wheel is defined as the ratio of the departure of the wheel velocity $V_\alpha$ from the vehicle vehicle velocity $V$ with respect to the vehicle velocity. Thus slip ratio is equal to $(V - V_\alpha)/V$. In the relationship between the slip ratio and the wheel deceleration, if the slip ratio is small the wheel deceleration is also small. This is so because the tire torque $T_T$ is small. If the slip ratio is great the wheel deceleration becomes high. Thus if the brake torque $T_B$ is added at the time of brake application to decelerate a wheel the wheel velocity decreases. Consequently, the tire torque $T_T$ increases together with the brake torque $T_B$ at a rate smaller than the brake torque $T_B$ by a value corresponding to a low wheel deceleration. At this time the tire torque $T_T$ increases as indicated by the arrow $a$ in FIG. 7 to approach the maximum value. If the above mentioned condition continues further the tire torque reaches the maximum value and increases no further. Therefore, the difference between the brake torque $T_B$ and the tire torque $T_T$ is rapidly increased. If the increase continues long enough skidding results. An example of the brake torque and tire torque increasing together appears between the times $t_1$ and $t_2$ in FIG. 4. Between the times $t_2$ and $t_3$ the difference between the brake torque $T_B$ and the tire torque $T_T$ begins to increase more rapidly.

As shown in FIG. 4 the system according to the invention decreases the brake torque $T_B$ when the tire torque $T_T$ reaches the maximum and the difference between the tire torque $T_T$ and the brake torque $T_B$ rapidly increases. Under these circumstances if the slip ratio is small and the wheel deceleration low, when the brake torque is decreased the wheel velocity is restored within a short period of time. This develops an accelerating condition rapidly. On the other hand, if the slip ratio is large and the wheel deceleration high, the recovery of the wheel velocity takes a longer time. Developing an acceleration is a slower process.

Since the wheel velocity is recovered quickly immediately after the brake torque $T_B$ is decreased, the tire torque $T_T$ is moved in the direction shown by the arrow $a$ in FIG. 7 by increasing the slip ratio so that the tire torque $T_T$ is maintained at a maximum during this period of time. When the brake torque $T_B$ decreases and becomes smaller than the tire torque $T_T$ and after the period of time has elapsed the wheel velocity is recovered slowly. Therefore, in this case the tire torque $T_T$ is moved in the direction shown by the arrow $b$ in FIG. 7 by increasing the slip ratio so that the tire torque $T_T$ is continuously maintained at the maximum from that time on.

In the disclosed embodiments, in the period before and after the decrease in the brake pressure torque $T_B$, the braking pressure is optimally controlled with the tire torque $T_T$ during the period of time maintained at or in the vicinity of the maximum value. This is done by increasing or decreasing the slip ratio, that is the wheel deceleration, in accordance with the difference between the brake torque $T_B$ and the tire torque $T_T$ regardless of the absolute value of the tire torque $T_T$. In these embodiments, a time $T$ is set immediately after the decrease in the brake torque $T_B$ in order to insure the optimum control of the braking pressure as described. Thus a set deceleration of large value occurs during the set time to increase the slip ratio. However, a set deceleration of smaller value is reduced after the elapse of the set time $T$ in order to decrease slip ratio.

In the described embodiment, the reference wheel velocity to be compared with the wheel velocity is set at a value smaller by the definite set velocity $v$. Moreover, the reference wheel velocity $V_\alpha$ is set in accordance with the change in the set deceleration so as to decrease the slip ratio between the wheel 10 and a road surface by increasing the pressure reducing time when the slip ratio is greater than that at which the coefficient of friction is at a maximum, but so as to decrease the pressure reducing time in order not to cause too much pressure reduction when the slip ratio is smaller than that at which the coefficient of friction is at a maximum. Thus, the braking pressure is controlled by seeking the slip ratio at which the coefficient of friction is the greatest. Consequently, the maximum tire torque is obtained in a wheel being braked and the minimum braking distance is provided without causing wheel lock.

As a further point, as skid control is not directly related with the magnitude of the coefficient of friction between a wheel and the road surface, devices according to this invention are quite advantageous in that optimum skid control is obtained on any kind of road surfaces including a frozen surface and a dried asphalt surface.

Braking systems on vehicles which can include apparatuses according to the invention may be of either the drum type or disc type. It is to be understood that this invention is not to be limited to the illustrated embodiments. For example, the electromagnetic change-over valve 71 may be replaced by a valve other than a spool valve and its driving source may utilize fluid. Furthermore, the driving source of the braking pressure modulating means 90 may utilize an electromagnetic force instead of fluid pressure such as air or the like.

Any type of inverting delay circuit which is bistable can be substituted for the NAND gate and the resistor 117 as well as the capacitor 116.

While specific embodiments of the invention have been shown and described in detail to illustrate the application of the inventive principles, it will be understood that the invention may be embodied otherwise without departing from such principles.

What is claimed is:

1. A brake force modulating apparatus for issuing signals to vary the braking force applied by a brake to a wheel in response to the wheel velocity, comprising comparator means responsive to the velocity of the wheel and to a reference level representing a reference velocity for issuing a first brake varying signal during a first relationship between the reference velocity and the wheel velocity and a second brake varying signal during a second relationship between the reference velocity and the wheel velocity, reference level establishing means responsive to said comparator means and forming an input to said comparator means for establishing the level and varying it with the wheel velocity at a maximum first rate in one direction during the first relationship and at a second rate during a predetermined fixed period of time after the start of the second relationship and a third rate during the second relationship at the conclusion of the predetermined period.

2. An apparatus as in claim 1, wherein said reference level establishing means includes level changing means for establishing a fourth rate after a second predetermined fixed time period has elapsed since the onset of the second relationship.

3. An apparatus as in claim 2, wherein the third rate is equal to the first rate and the fourth rate is equal to the second rate.

4. An apparatus as in claim 1, wherein said reference level establishing means includes maintaining means for maintaining the reference level at a predetermined relation to the wheel velocity when the wheel velocity varies less than the first maximum rate in the one direction during the first relationship.

5. An apparatus as in claim 4, wherein said reference level establishing means includes level changing means for establishing a fourth rate after a second predetermined fixed time period has elapsed since the onset of the second relationship.

6. An apparatus as in claim 4 wherein said reference level establishing means includes information storage means for establishing the level.

7. An apparatus as in claim 6, wherein said reference level establishing means includes first information adjusting means for changing the level in said storage means at the maximum first rate.

8. An apparatus as in claim 7, wherein said establishing means includes second adjusting means responsive to said comparator means for causing said information storage means to change at the second rate upon issuance of the second signal.

9. An apparatus as in claim 8, wherein said second adjusting means includes timing means for actuating said second adjusting means to cause said information storage means to change at the second rate for the given time.

10. An apparatus as in claim 9, wherein said establishing means includes adjusting means for establishing a fourth rate after a second predetermined fixed time period greater than the first given time period.

11. An apparatus as in claim 10, wherein said third adjusting means includes timing means.

12. An apparatus as in claim 11, wherein said reference level establishing means includes level changing means for establishing a fourth rate after a second given time period has elapsed since the onset of the second relationship.

13. An apparatus as in claim 4, wherein said establishing means includes setting means responsive to the onset of said first signal in said comparator for adjusting the level to the predetermined relationship so said maintenance means may maintain the given relationship.

14. An apparatus as in claim 13, wherein said reference level establishing means includes level changing means for establishing a fourth rate after a second predetermined fixed time period has elapsed since the onset of the second relationship.

15. An apparatus as in claim 14, wherein said establishing means includes first information adjusting means for changing the level of said storage means at the first rate, wherein said establishing means includes second adjusting means responsive to said comparator means for causing said information storage means to change at the second rate upon issuance of the second signal.

16. An apparatus as in claim 4, wherein said reference level establishing means includes level changing means for establishing a fourth rate after a second given time period has ealpsed since the onset of the second relationship.

17. An apparatus as in claim 1, wherein said reference level establishing means includes information storage means for establishing the level.

18. An apparatus as in claim 17, wherein said reference level establishing means includes first information adjusting means for changing the level in said storage means at the maximum first rate.

19. An apparatus as in claim 18, wherein said establishing means includes second adjusting means responsive to said comparator means for causing said information storage means to change at the second rate upon issuance of the second signal.

20. An apparatus as in claim 19, wherein said first and second adjusting means coact to change the level of said storage means.

21. An apparatus as in claim 19, wherein said second adjusting means includes timing means for actuating said second adjusting means to cause said information storage means to change at the second rate for the given predetermined fixed time.

22. An apparatus as in claim 21, wherein said establishing means includes third adjusting means for establishing a fourth rate after a second given time period greater than the first predetermined fixed time period.

23. An apparatus as in claim 22, wherein said third adjusting means includes timing means.

24. An apparatus as in claim 22, wherein said second and third adjusting means include logic means for jointly operating on said information storage means.

25. An apparatus as in claim 17, wherein said information storage means includes energy storage means.

26. An apparatus as in claim 25, wherein said establishing means includes first energizing means for changing the level of the energy in said storage means at the maximum first rate, wherein said establishing means includes second deenergizing means responsive to said comparator means for deenergizing said storage means at the second rate upon issuance of the second signal.

27. An apparatus as in claim 26, wherein said first and second deenergizing means coact to reduce the level of the storage means and wherein said second deenergizing means includes timing means for actuating said second deenergizing means to cause the level stored in said energy storage means to reduce at the second rate for the predetermined fixed time period.

28. An apparatus as in claim 27, wherein said establishing means includes third deenergizing means for establishing the fourth rate after the second predetermined fixed time period greater than the first time period.

29. An apparatus as in claim 1, wherein the first relationship is such that the wheel velocity exceeds the reference velocity and the second relationship is such that the reference velocity exceeds the wheel velocity.

30. An apparatus as in claim 29, wherein the level decreases at the maximum first rate and the second rate.

31. An apparatus as in claim 30, wherein said establishing means includes maintaining means for maintaining the reference voltage at a predetermined level less than the wheel velocity.

32. An apparatus as in claim 31, wherein said establishing means includes a capacitor for storage of information.

33. An apparatus as in claim 32, wherein said establishing means includes level changing means connected to said capacitor for establishing a fourth rate after the second given time period has elapsed since the onset of the second relationship, first charge reducing means for reducing the level of the charge on the capacitor at the maximum first rate, second charge reducing means responsive to said comparator means for reducing the charge across the capacitor at a second rate upon issuance of the second signal, and timing means for actuating said second reducing means to cause the charge across the capacitor means to reduce at the second rate for the predetermined fixed time period.

34. An apparatus as in claim 1, wherein the third rate is equal to the first rate.

35. A brake system comprising brake application means for applying a brake force to a wheel of a vehicle, brake force modulating means interposed between the braking means and the wheel, said modulating means including wheel velocity indicating means for producing a signal corresponding to the wheel velocity, comparator means in said modulating means responsive to the wheel velocity indicating means and to a reference level representing a reference velocity for issuing a first brake varying signal during a first relationship between the reference velocity and the wheel velocity and a second brake varying signal during a second relationship, reference level establishing means responsive to said comparator means and to said wheel velocity indicating means for establishing the level and varying it with the signal from the wheel velocity indicating means at a maximum first rate in one direction during the first relationship and at a second rate during a predetermined fixed period of time after the start of the second relationship and at a third rate thereafter.

36. A brake system as in claim 35, wherein said reference level establishing means includes level changing means for establishing a fourth rate after a second predetermined fixed time period has elapsed since the onset of the second relationship.

* * * * *